(12) United States Patent  
Lightfoot

(10) Patent No.: US 8,275,567 B2  
(45) Date of Patent: Sep. 25, 2012

(54) CORRECTION OF A RADIOACTIVITY MEASUREMENT USING PARTICLES FROM ATMOSPHERIC SOURCE

(75) Inventor: John Lightfoot, Cumbria (GB)

(73) Assignee: VT Nuclear Services Limited, Hampshire (GB)

( * ) Notice: Subject to any disclaimer, the term of this patent is extended or adjusted under 35 U.S.C. 154(b) by 746 days.

(21) Appl. No.: 12/281,970

(22) PCT Filed: Mar. 21, 2007

(86) PCT No.: PCT/GB2007/001026  
§ 371 (c)(1), (2), (4) Date: Jan. 22, 2009

(87) PCT Pub. No.: WO2007/107765  
PCT Pub. Date: Sep. 27, 2007

(65) Prior Publication Data  
US 2010/0010764 A1     Jan. 14, 2010

(30) Foreign Application Priority Data  
Mar. 22, 2006  (GB) .................................. 0605741.8

(51) Int. Cl.  
*G01C 19/00*  (2006.01)  
*G01D 18/00*  (2006.01)

(52) U.S. Cl. ..................................... 702/104; 250/252.1

(58) Field of Classification Search .................. 702/104, 702/1, 23, 26–32, 81, 84–85, 101, 127–129, 702/137, 173–174, 181–183, 188–190; 250/251, 250/301, 305–308, 332, 334, 370.08–370.11, 250/390.02, 390.04, 390.06, 390.11, 393, 250/396 R, 397, 492.1, 492.3, 580, 591  
See application file for complete search history.

(56) References Cited

U.S. PATENT DOCUMENTS  
3,035,173 A    5/1962 Miramond et al.  
5,594,250 A    1/1997 Condreva  
(Continued)

FOREIGN PATENT DOCUMENTS  
WO    WO 00/42447    7/2000

OTHER PUBLICATIONS

Borozdin et al., Scattering Muon Radiography and Its Application to the Detection of High-Z Materials, 2004 IEEE, pp. 1061-1064.*

(Continued)

*Primary Examiner* — Toan M Le  
(74) *Attorney, Agent, or Firm* — Workman Nydegger

(57) ABSTRACT

A method of correcting a measure of radioactive material within a body of material includes measuring a characteristic of the radioactive material to provide a measure, such as gamma emissions; detecting muons and/or electrons generated by muons which have not passed through the body of material to give a first value; detecting muons and/or electrons generated by muons which have passed through the body of material to give a second value; processing the first value and second value to give a factor, for instance indicative of the density of the body of material; and correcting the measure using the factor to obtain a corrected measure of the radioactive material with the body of material, for instance to correct for the density of the body of material and attendant issues such as attenuation and shielding.

36 Claims, 4 Drawing Sheets

U.S. PATENT DOCUMENTS

| | | | |
|---|---|---|---|
| 6,420,712 | B1 | 7/2002 | Menlove et al. |
| 6,509,563 | B1 | 1/2003 | McElroy, Jr. et al. |
| 2005/0105681 | A1 | 5/2005 | Kang et al. |
| 2006/0033036 | A1 | 2/2006 | Hailey |
| 2006/0081787 | A1 | 4/2006 | Prasad et al. |
| 2007/0001123 | A1 | 1/2007 | Andrews et al. |
| 2010/0010764 | A1 | 1/2010 | Lightfoot |

OTHER PUBLICATIONS

Gustafsson, J., Tomography of Canisters for Spent Nuclear Fuel Using Cosmic-Ray Muons, Oct. 2005, Department of Neutron Research, Uppsala University, Uppsala, Sweden, 36 pp.*

D.H. Beddingfield et al., *Distributed Source Term Analysis, a New Approach to Nuclear Material Inventory Verification*, Nuclear Instruments and Methods in Physics Research, Section A, vol. 485, No. 3, Jun. 11, 2002, pp. 797-804.

PCT/GB2009/002289, Jun. 30, 2010, International Search Report & Written Opinion.

Stephen Croft et al., *The Estimation of the Minimum Detectable Activity from Measured Passive Neutron Coincidence Counter Data*, Canberra Industries, Inc., 2005, 10 pages.

Stephen Croft et al., *The Specific Total and Coincidence Cosmic-Ray-Induced Neutron Production Rates in Materials*, Nuclear Instruments and Methods in Physics Research, A 505 (2003), pp. 536-539.

H. O. Menlove et al., *The Design of a High-Efficiency Neutron Counter for Waste Drums to Provide Optimized Sensitivity for Plutonium Assay*, $5^{th}$ Nondestructive Assay and Nondestructive Examination Waste Characterization Conference, Salt Lake City, Utah, Jan. 14-16, 1997.

J. Wolf, *Measurement of Muon Induced Neutron Background at Shallow Sites*, University of Karlsruhe, arXiv:hep-ex/0211032v1, Nov. 12, 2002, 6 pages.

G. Chapline et al., *Cosmic Ray Induced Neutron and Gamma-Ray Bursts in a Lead Pile*, UCRL-TR-230895, May 2007, 7 pages.

H. M. Araujo et al., *Measurements of Neutrons Produced by High-Energy Muons at the Boulby Underground Laboratory*, arXiv:0805.3110v1, May 20, 2008, 27 pages.

*Measurement of Muon Flux as a Function of Elevation*, The Cosmic Connection, www.lbl.gov/abc/cosmic/index.html, published at least as early as Sep. 13, 2001, 2 pages.

P. K. F. Grieder, *Cosmic Rays at Earth*, Chapter 2, Cosmic Rays in the Atmosphere, 2001, 249 pages.

P. K. F. Grieder, *Cosmic Rays at Earth*, Chapter 3, Cosmic Rays in the Atmosphere, 2001, 153 pages.

M.M. Pickrell, *Development of a High-Efficiency Neutron Counter Using Novel Materials*, $5^{th}$ Nondestructive Assay and Nondestructive Examination Waste Characterization Conference, Salt Lake City, Utah, Jan. 14-16, 1997.

Konstantin N. Borozdin et al., Scattering Muon Radiography and its Application to the Detection of High-Z Materials, 2004, IEEE, pp. 1061-1064.

* cited by examiner

CORRECTION OF A RADIOACTIVITY MEASUREMENT USING PARTICLES FROM ATMOSPHERIC SOURCE

BACKGROUND OF THE INVENTION

Field of the Invention

This invention concerns improvements in and relating to detection, particularly, but not exclusively in relation to corrections applied to the detection of radioactive emissions arising from within bodies of material.

SUMMARY OF THE INVENTION

According to a first aspect of the invention we provide a method of correcting a measure of radioactive material within a body of material, the method comprising:

measuring a characteristic of the radioactive material to provide a measure;

detecting one or more types of particle from an atmospheric source which have not passed through the body of material to give a first value;

detecting one or more particles from an atmospheric source which have passed through the body of material to give a second value;

processing the first value and second value to give a factor;

correcting the measure using the factor to obtain a corrected measure of the radioactive material with the body of material.

The first aspect of the invention may include any of the features, options or possibilities set out elsewhere in this document. The particles may be muons or electrons generated by muons.

According to a second aspect of the invention we provide a method of correcting a measure of radioactive material within a body of material, the method comprising:

measuring a characteristic of the radioactive material to provide a measure;

detecting muons or electrons generated by muons which have not passed through the body of material to give a first value;

detecting muons or electrons generated by muons which have passed through the body of material to give a second value;

processing the first value and second value to give a factor;

correcting the measure using the factor to obtain a corrected measure of the radioactive material with the body of material.

The second aspect of the invention may include any of the features, options or possibilities set out elsewhere in this document.

According to a third aspect of the invention we provide a method of investigating radioactive material within a body of material, the method comprising:

investigating a characteristic of the radioactive material;

directly detecting muons which have not passed through the body of material to give a first value;

directly detecting muons which have passed through the body of material to give a second value;

considering the first value and second value to give a factor;

using the factor to improve the investigation of the characteristic of the radioactive material with the body of material.

The third aspect of the invention may include any of the features, options or possibilities set out elsewhere in this document. The investigation may be a measurement of the characteristic, preferably to obtain a measure. The factor may be used to correct the measure to obtain a corrected measure of the radioactive material with the body of material.

The first and/or second and/or third aspects may include any of the following features, options or possibilities.

The measure of the radioactive material within a body of material may be corrected for density. The measure of the radioactive material within a body of material may be corrected for attenuation. The measure of the radioactive material within a body of material may be corrected for shielding, for instance self-shielding by radioactive material and/or shielding by non-radioactive material. The measure may be corrected for one or more of density, attenuation or shielding.

The body of material may include the container for material. The container may be a storage container. The container may be a transportable container. The container may be an ISO freight container, three quarter height ISO freight container, half height ISO freight container or third height ISO freight container. The container may be an Intermodel or part size thereof. The body of material may include one or more waste materials. The body of material may include one or more radioactive materials.

The method may include a step of determining the weight and/or mass of the container and its body of material. The method may determine the net weight or net mass of the container and its body of material. The method may determine the weight or mass of the body of material. The weight or mass may be determined at the measuring location and/or at another location.

The method may include the step of determining a determined density of the body of container and its body of material or a determined density of the body of material alone. The determination of the density may account for the extent to which the container is filled by the body of material. The extent of filling may be determined by inspection and measurement and/or inspection and estimation and/or measurement alone. The extent of filling may be measured using a transmission source, with a detector therefor on the other side of the container and/or body of material.

The measure of the radioactive material within a body of material may be corrected differently for different parts of the body of material. One or more of the different parts may be a field of view of a detector for the particles and/or a part of a field of view and/or a common part of the field of view of two or more detectors. The common part of the field of view of two detectors may be that part which lies within a first field of view and lies within a second field of view.

In one embodiment of the invention, one of the first or second fields of view may be that of a detector viewing the measuring location and/or body of material from below, with the other of the first or second fields of view being that of a detector viewing the measuring location and/or body of material from the side.

The use of a first field of view and second field of view may assist in the resolution of ambiguities present from the consideration of a single field of view. The consideration of the first field of view and second field of view may occur at the same time.

In another embodiment, the consideration of the first field of view and second field of view may occur at a first time and a second different time. One or more detectors, more preferably the body of material, may have changed orientation between the first time and the second time. The change in orientation may occur due to the container and/or body of material being advanced past the detectors between the first time and the second time. Preferably the container and/or body of material is stationary during the first time and/or the second time. The change in orientation may occur due to the detectors being advanced past the container and/or body of material between the first time and the second time. Preferably the detectors are stationary during the first time and/or the second time. The change in orientation may occur due to rotation, for instance through 90°.

The body of material may be a rectilinear volume. One or more of the different parts may be a segment of the body of material, for instance a rectilinear segment. The body of material may be formed of a plurality of segments. Preferably each segment extends the full height and/or width of the body of material and/or not the full length. A segment may include one or more different parts. Preferably the body of material and/or a segment and/or each segment includes a number of different parts which is a multiple of the number of first detectors and second detectors. The body of material may be considered as being of between 5 and 25 such segments, more preferably 8 to 18 segments and ideally 10 to 16 segments.

The measurement of the characteristic of the radioactive material may be the direct and/or indirect measurement of an emission by the radioactive material. The emission may particularly be gamma rays. One or more gamma ray energies may be considered. The measurement may be made by an emission detector. The emission detector may be different from the first detector and/or second detector, but preferably is the same detector as the first detector.

The measure may be a count and/or count rate and/or activity level and/or mass equivalent value.

The one or more types of particle may include muons. The one or more types of particle may include electrons generated by muons. The one or more types may be muons only.

The atmospheric source may be the interaction of the Earth's atmosphere, particularly the upper atmosphere, with one or more types of cosmic rays.

The particles may arise in excess of 500 metres from the body of material.

The first value may be obtained from one or more first detectors provided below the measuring location and/or body of material, but with the body of material absent. Preferably the first value is obtained from one or more second detectors provided above the measuring location and/or body of material. The first value may be obtained from one or more second detectors with the body of material absent from the measuring location, but is preferably obtained with the body of material present at the measuring location.

The second value may be obtained from one or more first detectors provided below the measuring location and/or body of material, with the body of material present. The second value may be obtained only from the one or more first detectors. The second value may be obtained from one or more first detectors, together with one or more third detectors. The one or more third detectors are preferably provided below the measuring location and/or body of material. The one or more third detectors are preferably provided below the one or more first detectors. The second value may be obtained from one or more first detectors, together with one or more second detectors. Where the second value is obtained from one or more first detectors and one or more third detectors or from one or more first detectors and one or more second detectors, the second value may be a count or count rate of muons or electrons which interact with both a first and third detector or a first and second detector.

The particles may be detected without having passed through the body of material by providing one or more second detectors. The one or more second detectors may be provided within 25 metres of the body of material and/or measuring location for the body of material. Preferably the one or more second detectors are provided within 2 metres of the body of material and/or are provided above the body of material, ideally vertically above the body of material. Preferably the particles are detected without having passed through the body of material by one or more second detectors, with the body of material at the measuring location and/or at the same time as the particles are detected having passed through the body of material.

A second detector may be provided for each first detector. Preferably a second detector is provided vertically above a first detector, with the body of material or measuring location therefore between the first and second detectors. Ideally each second detector is provided above a first detector.

The first and second detectors may be of the same type and are preferably identical to one another. The first and second detectors are preferably sensitive to muons and gamma rays. The first and/or second detectors may be scintillators, for instance plastic scintillators.

A plurality of first and/or second detectors may be provided, preferably in pairs. Three or four detectors are preferably provided above the measuring location. Three or four detectors are preferably provided below the measuring location. A detector may be formed of two or more detectors, the outputs for which are considered as one.

Preferably one or more of the detectors, ideally all, are provided within 2 m of the edge of the measuring location and/or a part of the container for the body of material. Preferably one or more of the detectors, ideally all, are provided within 1.5 m, and still more preferably within 1 m of the edge of the measuring location and/or a part of the container for the body of material. The position of one or more of the detectors may be adjustable.

The particles may be detected without having passed through the body of material by providing the detection with the body of material absent from a measuring location. The particles may be detected without having passed through the body of material by undertaking such a detection before the body of material is introduced to a measuring location and/or after the body of material is removed from a measuring location. The particles may be detected without having passed through the body of material by using historical information on muon flux.

Preferably both first and second values are obtained by measurement at the same place and/or at the same time as each other.

The particles may be detected having passed through the body of material by providing one or more first detectors to one side of the body of material and/or measuring location. Preferably the one or more first detectors are provided below the body of material and/or measuring location. Preferably the one or more first detectors are provided within 1 metres of the body of material and/or are provided below the body of material, ideally vertically below the body of material. Preferably the particles are detected having passed through the body of material by one or more first detectors, with the body of material at the measuring location and/or at the same time as the particles are detected without having passed through the body of material.

The first value may be a count rate and/or count and/or energy value and/or energy distribution.

The second value may be a count rate and/or count and/or energy value and/or energy distribution. Preferably the first and second values are of the same type.

The first value and second value may be processed to give a factor based upon one or more first values and one or more second values. The change between the second value energy distribution and the first value energy distribution may be processed to reach the factor. The change between a first value and a second value, for instance as energies, may be used to reach the factor. The factor may be a result of the processing of a plurality of first values and/or plurality of second values, for instance a plurality of pairs of first and second values.

The first value and/or second value may be considered for all particles detected by the first detector and/or second detector. The first value and/or second value may be considered for those particles which pass through and/or interact with a first detector and a second detector. Preferably the first value and/or second value are considered only for those particles which pass through and/or interact with a first detector and a second detector. Preferably only coincidence particles are considered.

In one embodiment of the invention, the first detector may be provided below the body of material and/or measuring location and serves as the second detector when the body of material is absent from the measuring location.

In another embodiment of the invention, the first detector may be provided below the body of material and/or measuring location, with the second detector being provided above the body of material and/or measuring location.

In another embodiment of the invention, one or more first detectors may be provided below the body of material and/or measuring location, with one or more third detectors provided below the body of material and preferably below the first detectors. Preferably only particles which interact or pass through one of the first detectors and one of the third detectors are used in obtaining the second value. The first value may be obtained from one or more second detectors, preferably provided above the body of material.

In another embodiment of the invention, one or more, preferably a plurality of, first detectors may be provided below the body of material and/or measuring location, with one or more, preferably a plurality of, second detectors provided above the body of material. Preferably only particles which interact or pass through a first detector and a second detector are used in obtaining the second value and/or first value.

A particularly preferred embodiment provides three or four first detectors below the body of material and/or measuring location, with three or four second detectors provided above the body of material. Preferably only particles which interact or pass through a first detector and a second detector are used in obtaining the second value and/or first value.

The factor may be a density or density based factor.

In one possible form, the ratio of the second value to the first value, or the reciprocal ratio, may provide an indication or measure of the density for the body of material, and more preferably for a segment thereof. Different density values may be determined for different segments.

In another possible form, the ratio of the coincidence count value observed in the first value and second value to the first value, or the reciprocal ratio, may provide an indication or measure of the density for the body of material, and more preferably for a segment thereof. The first value is preferably a measure of the background level of muons. The coincidence count value is preferably a measure of the effect of the body of material, or a segment thereof, on the level of muons. Different density values may be determined for different segments.

In another possible form, the ratio of the coincidence count value obtained from the first detectors and third detectors to the first value, or the reciprocal ratio, may provide an indication or measure of the density for the body of material, and more preferably for a segment thereof. The first value is preferably a measure of the background level of muons. The coincidence count value is preferably a measure of the effect of the body of material, or a segment thereof, on the level of muons. Different density values may be determined for different segments.

The ratio of the coincidence count value obtained from within the first value and second value may be considered. The ratio of the coincidence count value obtained from within the first value and second value to the first value may be considered. The coincidence count value may be obtained from the first detector(s) and third detector(s) provided below the measuring location or body of material, but is preferably obtained from the first detector(s) provided below the measuring location or body of material and the second detector(s) provided above the measuring location or body of material. The first value is preferably a measure of the background level of muons. The coincidence count value is preferably a measure of the effect of the body of material, or a segment thereof, on the level of muons. The ratio of the coincidence count value to the first value is preferably expressed as a fraction.

The first value may be corrected before being used in a processing step. The first value may be corrected for the effect of the detector geometry and, particularly, for the effect of geometry in respect of the pair of first and second detectors and/or pair of first and third detectors used to obtain the second value. The processing step may be the consideration of the ratio of the coincidence count value obtained from within the first value and second value and more particularly, the ratio of the coincidence count value obtained from within the first value and second value to the first value.

A separate correction may be provided for each first value. Preferably a separate correction is provided for each first value, with the correction being specific to the pair of first and second detectors giving the second value and/or the pair of first and third detectors giving the second value.

Preferably the first value is corrected to account for the fraction of particles which pass through a second detector, but do not pass through a first detector with the container and body of material and/or body of material absent from between the detectors. Preferably the first value is corrected to account for the fraction of particles which pass through a particular second detector, but do not pass through a particular first detector with the container and body of material and/or body of material absent from between the detectors.

The correction may account for the relative spacing and/or orientation of the first and second detectors or first and third detectors. The correction may account for the shape, for instance the depth and/or width and/or length of the first and/or second and/or third detectors.

The correction may be experimentally determined. Preferably one or more correction factors are experimentally determined. Preferably a correction factor for the second detector is determined for each pairing of the second detector with a first detector. Preferably this is repeated for each second detector. Preferably a correction factor for the first detector is determined for each pairing of the first detector with a third detector. Preferably this is repeated for each first detector.

Preferably the correction is experimentally determined by providing the one or more first and/or second and/or third detectors in the same geometrical arrangement as will be used for investigating a radioactive material within a body of material, and obtaining a first value and a second value with the body of material absent. The first value and second value may be obtained over a period of at least 6 hours, preferably at least 12 hours, more preferably at least 20 hours and ideally at least 40 hours.

The ratio of the coincidence count value to the first value, preferably as a fraction, may be used to account for the effect of the body of material and/or container and body of material on particles passing through the second detector and on a path which would have taken them through the first detector if the body of material and/or container and body of material were absent or on particles passing through the first detector and on a path which would have taken them through the third detector if the body of material and/or container and body of material were absent. The ratio of the coincidence count value to the first value, preferably as a fraction, may be used to calculate an expression of areal density for the body of material or segment thereof, ideally an areal density.

The calculation of an expression of areal density or of an areal density may use a lookup table or formula. The lookup table or formula is preferably experimentally derived. The calculation may directly convert a fraction into an areal density.

Where two or more first detectors and/or two or more second detectors and/or two or more third detectors are provided, preferably the ratio of the coincidence count value to the first value is considered for two or more different pairs of detectors. A pair may be form of a first and third detector, but is preferably formed of a first and second detector. Preferably a calculation of an expression of areal density, and ideally of areal density, is provided for two or more pairs. Preferably a calculation of an expression of areal density, and ideally of areal density, is provided for each possible pair of detectors.

Preferably a plurality of expressions of areal density, ideally areal densities, are obtained for the body of material, or still more preferably for each segment thereof. Preferably an expression of areal density, ideally areal density, is obtained for each possible pair of first and second detectors and/or each possible pair of first and third detectors for the body of material, or still more preferably for each segment thereof.

Preferably where a plurality of expressions of areal density or areal densities are obtained for a body of material, or more preferably a segment, those expressions or densities are combined to give a combined areal density expression or combined areal density. Preferably all the expressions or densities for a body of material or for a segment are combined. Nine expressions or densities may be used, more preferably sixteen expressions or densities. Preferably the expression of combined density or combined density results from a weighted combination of two or more expressions or densities. Preferably the weighting involves a consideration of one or more of: the path length through the body of material between the detector pair; the vertical separation of the detectors of the detector pair; the effective volume lying between the detectors of the detector pair; the precision value for the count rate for that pair of detectors. Combined areal density expressions or combined areal density may be obtained for each of at least 5 segments, more preferably each of at least 10 and ideally each of at least 16 segments.

Preferably the ratio of the coincidence count value obtained to the first value may be considered and/or a calculation of an expression of areal density, and ideally of areal density, is provided for two or more pairs of detectors and/or the combination of expressions of areal density or areal density are combined to give a combined areal density expression or a combined areal density, for a plurality of segments, and ideally for all of the segments of the body of material.

The combined expression of areal density or the combined areal density for all of the segments may be used to calculate a calculated areal density function for the body of material and/or the container and body of material. The calculated areal density function may be compared with the determined density. One or more segments, preferably all segments, may have their expression of areal density or areal density adjusted if the calculated density is different from the determined density. One or more segments, preferably all segments, may have their expression of areal density or areal density normalised, preferably based upon the calculated density compared with the determined density.

More preferably, the combined expression of areal density or the combined areal density for all of the segments may be used to calculate a calculated mass or weight for the body of material and/or the container and body of material. The calculated mass or weight may be compared with the determined mass or weight. One or more segments, preferably all segments, may have their expression of areal density or areal density adjusted if the calculated weight or mass is different from the determined weight or mass. One or more segments, preferably all segments, may have their expression of areal density or areal density normalised, preferably based upon the calculated weight or mass compared with the determined weight or mass.

The adjusted expression of areal density or adjusted areal density may be used in the factor. Preferably the adjusted expression of areal density or adjusted areal density for a segment is used in the factor for that segment. Preferably all the segments are treated in this way.

The correcting of the measure using the factor may increase the measure. The increase in the measure may correct the measure from an observed value to or towards the value of the measure actually emitted. The correcting of the measure may account fully or partially for the effect of attenuation and/or shielding by the body of material and/or radioactive material. The correcting of the measure may be proportional to the density of the body of material or segment thereof.

According to a fourth aspect of the invention we provide apparatus for measuring radioactive material within a body of material, the apparatus including:

one or more detectors for measuring a characteristic of the radioactive material to provide a measure;

one or more detectors provided above a measuring location for detecting one or more types of particle from an atmospheric source which have not passed through the body of material to give a first value;

one or more detectors provided below a measuring location for detecting one or more particles from an atmospheric source which have passed through the body of material to give a second value;

a processor for processing the first value and second value to give a factor;

a processor for correcting the measure using the factor to obtain a corrected measure of the radioactive material with the body of material.

The fourth aspect of the invention may include any of the features, options or possibilities set out elsewhere in this document.

According to a fifth aspect of the invention we provide a method of correcting a measure of radioactive material within a body of material, the method comprising:

measuring a characteristic of the radioactive material to provide a measure;

using a second detector to detect one or more types of particle from an atmospheric source which have not passed through the body of material to give a first value;

using a first detector to detect one or more particles from an atmospheric source which have passed through the second detector and the body of material to give a second value;

processing the first value and second value to give the factor, the factor being an expression of density and being a function of the second value divided by the product of a calibration factor and the first value; and correcting the measure using the factor to obtain a corrected measure of the radioactive material with the body of material.

The fifth aspect of the invention may include any of the features, options or possibilities set out elsewhere in this document.

According to a sixth aspect of the invention we provide a method of establishing the error in a factor, the factor being used in a method of correcting a measure of radioactive material within a body of material, the method comprising:

measuring a characteristic of the radioactive material to provide a measure;

using a second detector to detect one or more types of particle from an atmospheric source which have not passed through the body of material to give a first value;

using a first detector to detect one or more particles from an atmospheric source which have passed through the second detector and the body of material to give a second value;

processing the first value and second value to give the factor, the factor being an expression of density and being a function of the second value divided by the product of a calibration factor and the first value; and correcting the measure using the factor to obtain a corrected measure of the radioactive material with the body of material;

wherein the establishing of the error involves:

considering the first value as being accurately measured, considering the calibration factor as being accurately known and considering the second value as being the first value multiplied by a probability, the probability being that of a particle contributing to the first value and to the second value.

The sixth aspect of the invention may include any of the features, options or possibilities set out elsewhere in this document.

The error in the second value may be considered to be the square root of the product of the first value and the probability. The error in the second value may be considered to be the square root of the second value.

The error in the factor may be considered to be the square root of the second value divided by the product of the calibration factor and the first value.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
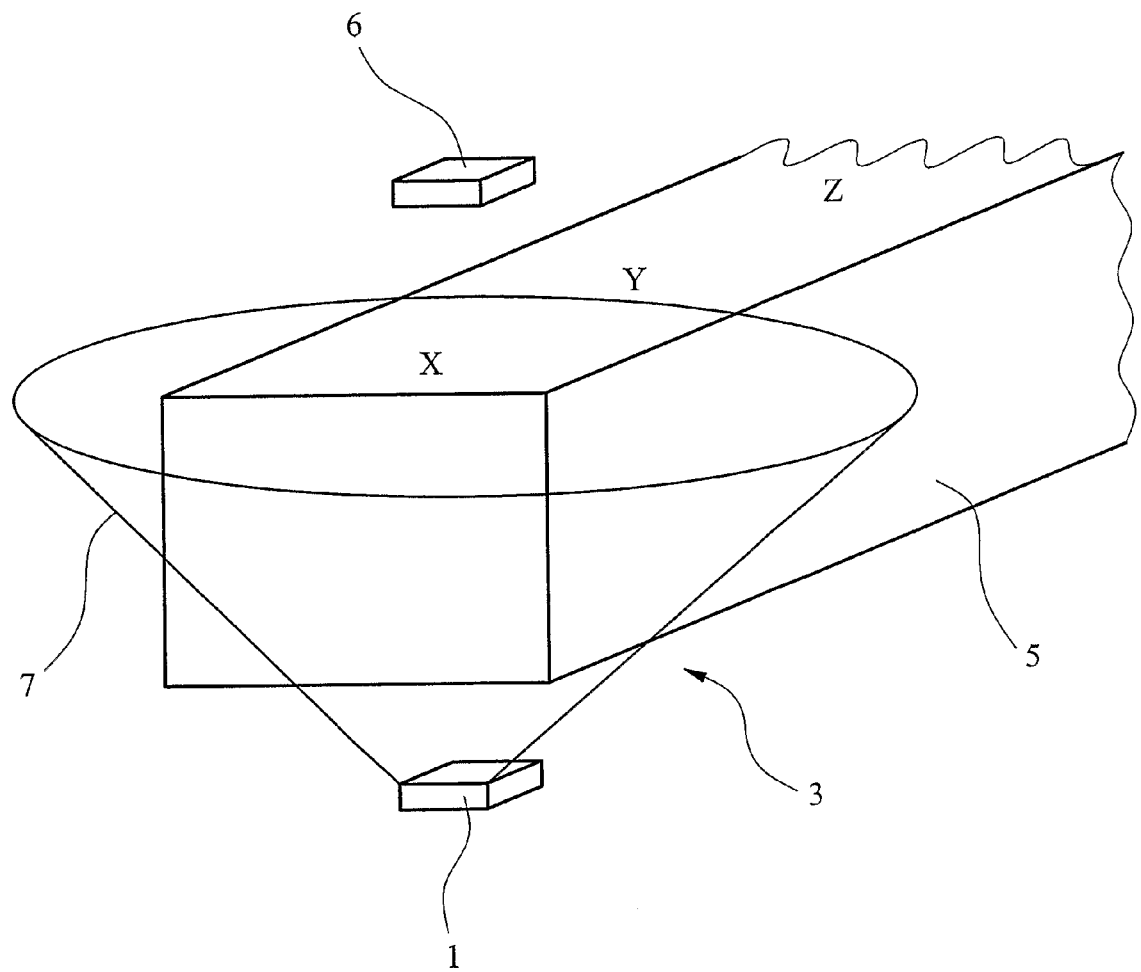
FIG. 1 is an illustration of a first embodiment of the present invention.

In a variety of situations, there is a need to accurately determine the amount and/or nature of radioactive material within a body of material. Such determinations are useful in determining the storage strategy to be applied to a body of material, for safety reasons and for other purposes. Generally, a determination can be made by placing one or more detectors sensitive to a characteristic of the radioactive material at a suitable position relative to the body of material.

Such a determination is subject to potential errors from a number of sources. For instance, the level of the characteristic actually arising from the decay process may be higher than the level of that characteristic by the time it leaves the radioactive material. This may arise due to self-shielding by the radioactive material where it is present as a significant lump, for instance. Even that level may be higher than the level by the time the edge of the body of material is reached, due to shielding by non-radioactive materials or other lumps of radioactive material within the body of material. As well as a potential reduction in the level of the characteristic, there is also the potential for the nature of the characteristic to be altered. Attenuation can reduce the energy of a characteristic, for instance.

Attempts have been made to enable a correction for shielding and/or attenuation by the radioactive material and/or body of material. These attempts often involve the selection of a transmission source having emissions of known characteristics. This is then placed to one side of the body of material. A detector sensitive to these emissions is then placed on the other side of the body of material. Differences between the detected emissions from the transmission source compared with the transmitted emissions inform on the body of material and/or radioactive material within it and their influence on emissions arising from the radioactive material within the body of material.

The applicant proposes to use a different approach to a transmission source to those used previously.

There is an increasing need to make determinations for large bodies of material, such as ISO freight containers or half ISO containers. To use a transmission source for correction purposes in such a case would involve the use of a large transmission source with a high level of emissions (so as to ensure that enough emissions pass through the body of material and reach the opposing detector). Such large sources give rise to safety issues, necessitating complex and expensive mechanisms to expose for use and shield when not in use.

As a new approach, therefore, the applicant proposes a different source for the characteristic being considered and a number of different ways in which that different source can be used.

Instead of using emissions from a source which is manufactured, whose physical position can be controlled and which is placed in proximity with the body of material, the emissions used are generated by cosmic rays which enter the Earth's atmosphere. In particular the emission of use is the naturally occurring flux of muons which are generated in this way in the Earth's atmosphere. The muon is a single charged particle with a mass 106 MeV, 205 times the mass of an electron. Muons are the dominant part of the cosmic ray flux at the Earth's surface. They occur with a wide range of energies, generally between 100 sMeV to 100 sGeV. The flux declines as the angle from the vertical increases according to a $\cos^2$ function. Even at the horizontal, however, the flux is not zero.

The ability of at least some of the muon flux to pass through even massive objects makes them useful in the correction context in question. Some examples of the range of muons within materials at different energies are set out in Table 1.

TABLE 1

| Material | Volume Density g·cm$^{-3}$ | Range (m) of muons with energy | | |
|---|---|---|---|---|
| | | 0.3 GeV | 3 GeV | 30 GeV |
| Water | 1.00 | 1.4 | 13.6 | 136.4 |
| Concrete | 2.50 | 0.5 | 5.5 | 54.5 |
| Iron | 7.87 | 0.2 | 1.7 | 17.3 |
| Lead | 11.35 | 0.1 | 1.2 | 12.0 |
| Uranium | 18.95 | 0.1 | 0.7 | 7.2 |

A first method which uses muons is illustrated in FIG. 1. A detector 1 is provided below a measuring location 3. By taking a measurement without an ISO freight container 5 present and taking a measurement with it present, as shown, the impact of the ISO freight 5 and its contents, the body of material, and of the radioactive material therein on the muons passing through can be established. The greater the density of material in the muon path, the greater the reduction in signal.

As the muon flux varies with time, and as the detectors are of relatively low cost, a further detector 6 may be provided to measure the "without" value for the muons. This removes the need for measurements by the detector 1 with the ISO freight 5 at the measurement location and with it absent. The measurement is faster (as the two measurements are made at the same time) and more accurate (the same flux is being measured at the same time).

Such a system is able to discriminate between the muon contribution to the detector signals and the gamma contribution based upon the different energies. The interaction of the muons with the detector is appropriate for ready detection. A muon has an energy loss of around 2.2 MeV·cm$^{-1}$ in a plastic scintillator, rising with falling energy of the muon. A detector of a few centimetres thickness can readily generate a signal of 10 MeV·cm$^{-1}$ or more and this makes such a signal readily discernable from signals arising from gammas from the radioactive material.

Because of the source of the muons and the cos$^2$ function decline away from the vertical, in effect a vertically collimated beam is provided. The determination informs upon the overall density of the body of material and any radioactive material in the field of view 7 of the detector 1, in the illustrated example this is generally conical. As the field of view 7 does not include the whole of the length of the ISO freight 5, moving the ISO freight 5 relative to the detector 1 provides potentially different density information on different parts X, Y, Z of the ISO freight 5 and its contents.

Figure 2:
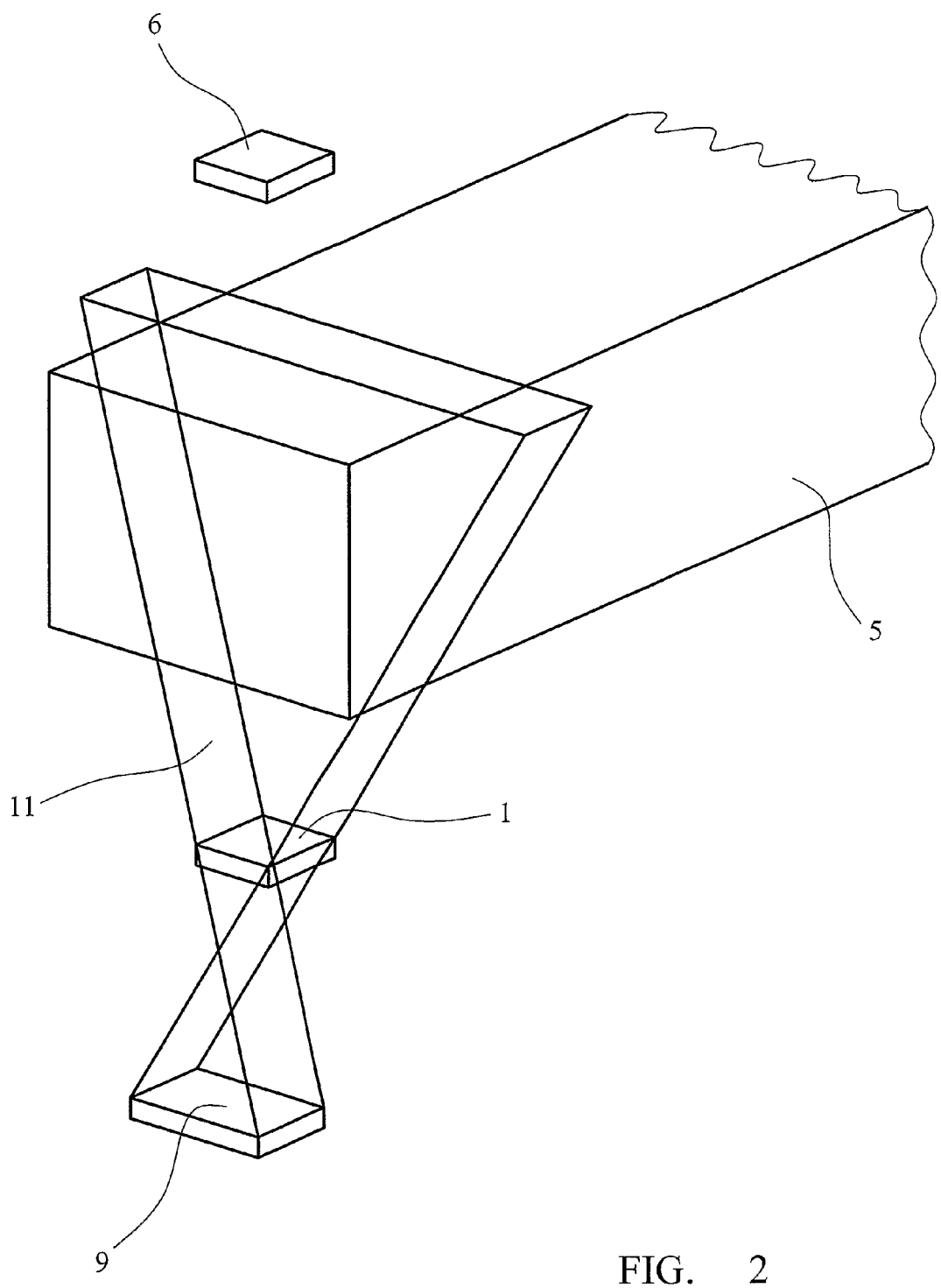
FIG. 2 is an illustration of a second embodiment of the present invention.

In the second form of the invention, illustrated in FIG. 2, the detector 1 below the measuring location is supplemented by a second detector 9 of the same type. In this case, coincident muons between the two detectors are considered; that is instances of the same muon passing through the detector 1 and then the detector 9. This requirement for passage through both detectors constrains the field of view from which the muons must have come. In this case a rectangular cross-section pyramid field of view 11 arises due to the slab style detectors 1, 9 involved. In this case, the muon signal is discernable from the gamma signal both due to energy and due to coincidences.

The tighter field of view 11 which results enables more location specific density measurements to be made.

As with the first form of the invention, the flux level before the impact of the ISO freight 5 on it can be determined by undertaking with and without the ISO freight 5 present measurements using detectors 1, 9 or by using a detector 6 in parallel.

Figure 3:
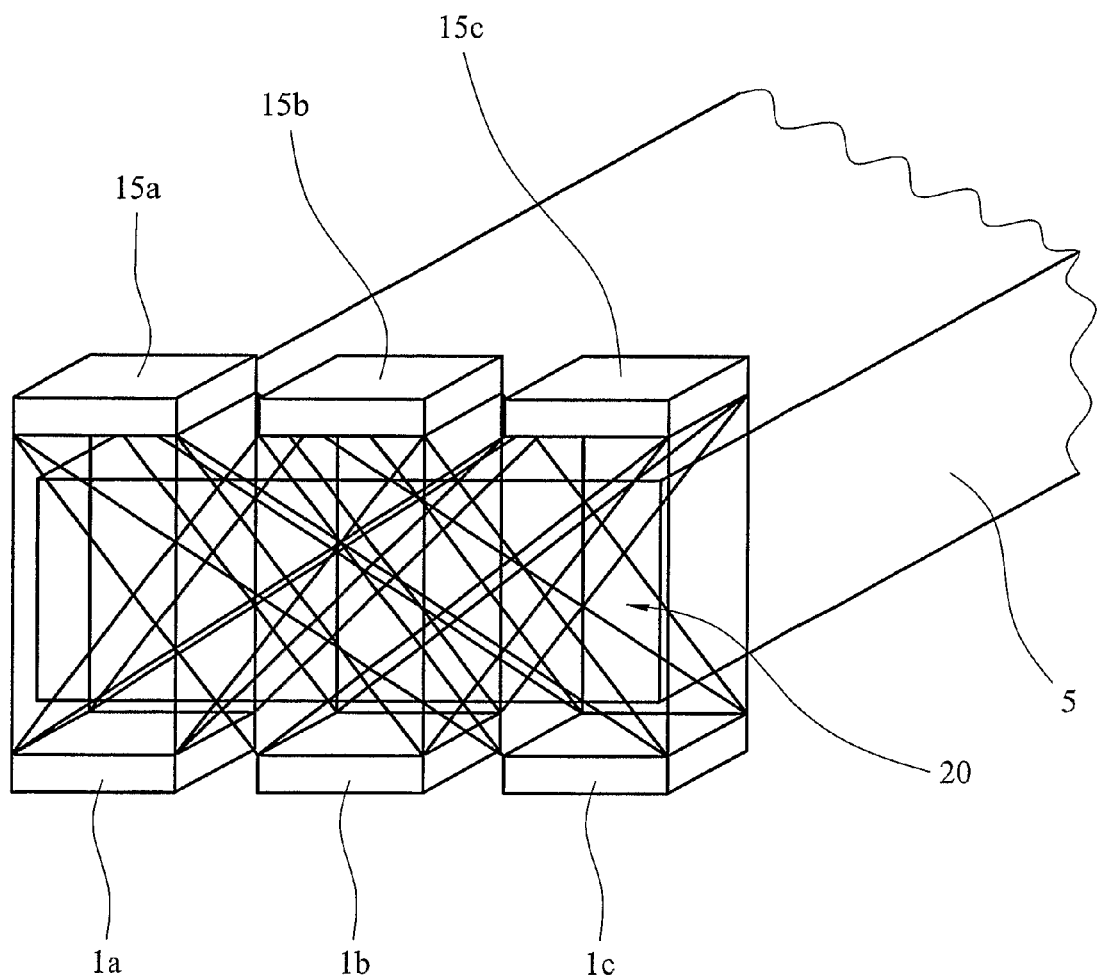
FIG. 3 is an illustration of a third embodiment of the present invention.

In the third form of the invention shown in FIG. 3, a detector 1 is placed below the ISO freight 5 and contents, the body of material, to be considered and a further detector 15 of equivalent type is provided above the ISO freight 5. Once again, the interaction between the muon and further detector 15 gives rise to a signal, with a signal also arising in the detector 1 when the same muon passes through that detector 1 and a coincidence detection occurs. The timing of signals from the two detector 1, 15 is considered to establish those signals which are deemed to have arisen from both detectors 1, 15 interacting with the same muon. The reduction in energy for the lower energy of the two interactions is deemed to be due to the effect of the body of material and/or radioactive material lying on the path between the two detectors 1, 15. The greater the reduction in energy, the greater the density and hence shielding and/or attenuation effect.

The same principle of operation applies for each of the three detectors 1a, 1b, 1c and the three further detectors 15a, 15b, 15c. Furthermore coincidences between the various combinations can also be considered, detectors 15a and 1b etc thereby giving nine counting channels in total. This number of detectors is for illustration only, with greater numbers and/or similar sets of detectors arranged along the length of the ISO freight 5 possible. The use of a number of detectors 1 and a number of further detectors 15 in such a configuration means that good coverage of a segment 20 of the ISO freight is achieved, due to the overlapping fields of view for the detector combinations, and a specific density for the segment can be determined, with further determinations specific to further segments possible.

The further detectors 15 can also serve the function of detecting the flux before it encountered the ISO freight 5 due to the position in the flux path before the ISO freight 5.

The provision of multiple detectors 1 and further detectors 15 also means that information on the density distribution with a segment 20 can be obtained. This can be done by considering the differences observed for the different combinations in conjunction with the geometry of their fields of view. With the six detectors exemplified, a 3 by 3 pixel display of potentially different densities for the segment could be provided. Greater numbers of detectors 1 and further detectors 15 would allow greater resolution within a segment.

Beneficially, the detectors 1 can be mounted very close to the bottom of the ISO freight 5 thereby avoid the need for a deep space below. Detectors placed to the side can be used to reduce any ambiguities or give further resolution.

Of course the detectors 1 in such an arrangement could also be used in detached consideration from the further detectors 15, in a similar manner to the examples above.

In the above description, we have concentrated on the use of muons to inform on the density of material encountered in a body of material, whether that be from the body itself and/or radioactive material contained therein. Accompanying the muon flux is a flux of electrons at approximately 35 to 40% of the muon flux level. Whilst such electrons are insufficiently penetrating to pass through a significant thickness of material, particularly material of higher density, they can be used in a similar way to inform upon thinner materials and/or less dense materials. In general the electrons would be blocked entirely by a lead thickness of 15 cm (density 167 g·cm$^{-1}$).

In the embodiments of the invention described above with reference to FIGS. 1, 2 and 3, the approach has relied upon measurement of the effect of the body of material on the count rate for the muons or electrons. The count rate either relate to detection of the muons or electrons or relate to detecting coincidences involving them. This is then used to give a direct measure of the density of the body of material in the segment for which the measurement was performed. In the next embodiment an alternative approach is taken.

Figure 4:
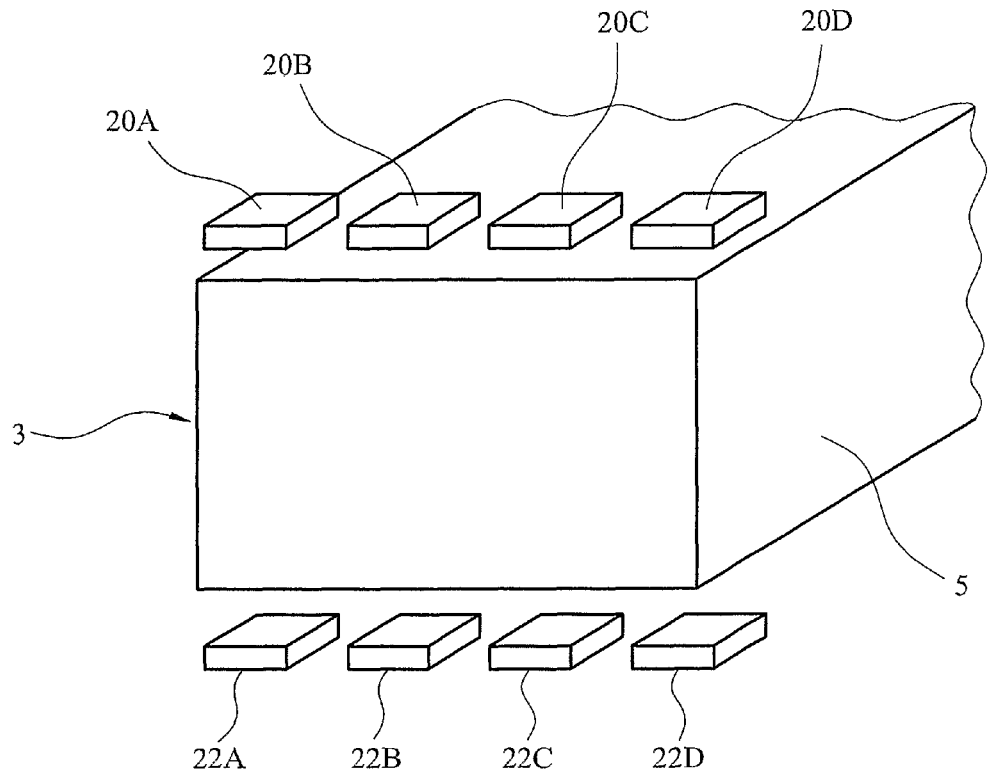
FIG. 4 is an illustration of a fourth embodiment of the present invention.

As shown in FIG. 4, the general configuration of the system is similar to that described above. The ISO freight 5 is provided within a measuring location 3. Four detectors 20 are provided above the measuring location 3 and a further four detectors 22 are provided below the measuring location 3.

The detectors 20, 22 are positioned as close to the ISO freight 5 as reasonably possible. Similar arrangements can be used for a wide variety of container types. In the context of ISO freights 5, ⅓, ½, ⅔ and ¾ height containers can be considered. The position of the top row of detectors 20 may be adjusted downward for reduced height containers so as to achieve the minimum separation between the lower detectors 22 and upper detectors 20.

The detectors 20, 22 are usually of the same type, shape and size as one another. Each one of the detectors 20, 22 may in practice be a series of smaller detectors the outputs from which are treated as one. Plastic scintillator are used, each connected to a photomultiplier or equivalent and then having the output from the photomultiplier fed to a fast discriminator. The fast discriminator is used to distinguish between cosmic originating counts, muons etc, and gamma rays; with the gamma rays being discarded. The output from the fast discriminator is fed to a counting step, either operated by software or by computer controlled hardware.

The net weight of the ISO freight 5 is required for this embodiment of the invention. The net weight may be obtained at a weight station at which the ISO freight 5 is provided before or after or during the radiometric measurements. The weighing station may be at the measuring location 3.

The net weight of the ISO freight 5 is used later in the processing and is considered as the observed weight.

Before the ISO freight 5 is introduced to the measuring location 3, a measurement is taken of the muon or electron background count so as to verify the performance of the coincidence detectors 20, 22. A further such measurement is taken after the ISO freight 5 has left the measuring location 3.

During the measuring method, 10 to 16 different measurements are taken at different positions along the length of the ISO freight 5, so as to in effect divide it into 10 to 16 segments. Such a number effectively considers the 6 m length of an ISO freight 5. The ISO freight 5 is stationary during each measurement.

During each measurement the following counts are established, with reference to detectors 20A, 20B, 20C, 20D provided above the measuring location 3, and with reference to detectors 22A, 22B, 22C, 22D provided below the measuring location 3:

20A singles count;
20B singles count;
20C singles count;
20D singles count;
22A singles count;
22B singles count;
22C singles count;
22D singles count;
20A and 22A coincidences;
20A and 22B coincidences;
20A and 22C coincidences;
20A and 22D coincidences;
20B and 22A coincidences;
20B and 22B coincidences;
20B and 22C coincidences;
20B and 22D coincidences;
20C and 22A coincidences;
20C and 22B coincidences;
20C and 22C coincidences;
20C and 22D coincidences;
20D and 22A coincidences;
20D and 22B coincidences;
20D and 22C coincidences; and
20D and 22D coincidences.

All of these measurements are stored for later retrieval and processing.

The subsequent processing involves taking each of the 16 coincidence counts at each measurement and expressing it as a fraction of the singles count for the appropriate top detector 20, but with the singles count rate corrected for the impact of the geometry of the pair of detectors it is being considered in conjunction with. Thus the coincidence for 20A and 22A is expressed as a fraction of the singles count for 20A with the singles count rate corrected for the geometry of detector pair 20A and 22A; the coincidence count for 20A and 22B is expressed as a fraction of the singles count for 20A with the singles count rate corrected for the geometry of detector pair 20A and 22B; the coincidence count for 20D and 22A is expressed as a fraction of the singles count for 20D with the singles count rate corrected for the geometry of detector pair 20D and 22A etc. The coincidence count in the case of each pair is divided by the corrected singles count for that pair.

The correction for geometry is a correction which accounts for the fraction of particles passing through the top detector which will not pass through the bottom detector, with the body of material absent, due to geometry. Basically, this fraction will be higher for an offset pair of detectors, such as detectors 20A and 22D, than for a pair of detectors vertically aligned with one another, such as detectors 20A and 22A.

This fraction is obtained through geometry calibration. For each detector pair, the geometry calibration is obtained by conducting measurements with the detectors in the same geometry as for the measurements of a body of material, but with the body of material absent. It is preferred that measurements for determining the fraction are conducted over a significant period, say 1 or 2 days, so as to give a statistically good measure of the fraction for each pair. The results for a pair may be stored, as a value or formula or look up table for use in measurements of actual samples.

Basically the correction says that whilst a flux of muons N may pass through the top or second detector 20, simply due to geometry alone, only a flux C would reach the bottom or first detector 22. As discussed further below, with a body of material present the flux that would reach the bottom or first detector 22 is reduced still further due to the body of material to a flux L. As a result of the correction for a particular pair, the impact of the geometry on the coincidence count is removed.

In the above example, this processing results in 16 corrected fractions for the measurement of that segment of the body of material.

In the next stage of the processing, the effect of the body of material geometry is taken into account. Basically, account is taken of the fraction of particles passing through the top detector and which will not pass through the bottom detector, due to the body of material being present. This is the other factor impacting upon the bottom detector count, the impact due to geometry having already been removed. Basically, this impact will be higher for a high density body of material than for a low density body of material.

Figure 5:
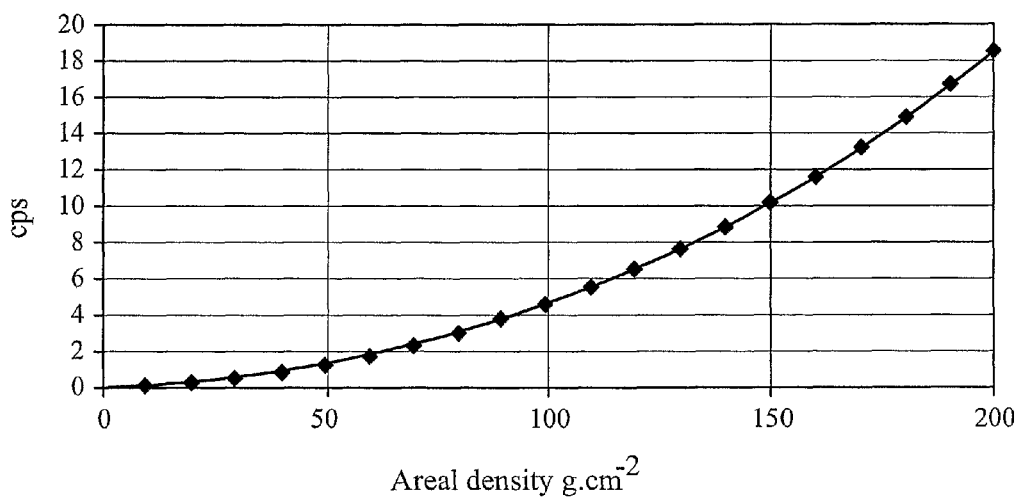
FIG. 5 is a graph showing the variation in fraction with areal density.

The account of the impact is obtained by reference to areal density calibration data. The areal density calibration data is used either as a lookup table or as a formula. The areal density calibration data arises from modelling, or more preferably, real measurements of a wide variety of different absorbing materials so as to determine the impact of the absorbers on the fraction count with different areal densities. An example of the calibration data is shown in FIG. 5 and is a plot of fraction count rate with areal density. Minimising the separation between top and bottom detectors is very important in obtaining count rates which allow accurate resolution of the areal density at high density values.

Basically the approach says that if the flux on the top detector is N, then the impact of the geometry and body of material is to reduce that to flux L at the bottom detector.

Each of the 16 fraction values can be converted to an areal density value using the experimentally obtained values and the calibration data, for instance as shown in FIG. 5.

The 16 areal density values for a segment are combined to give a combine areal density for that segment. The combination process is preferably weighted. Various factors can be used to determine the weighting for each of the 16 areal density values. Factors may include the path length through the ISO freight 5 for that pair of detectors, the vertical separation of the detectors, the effective volume sampled by each detector pair, the precision on the count rate for that detector pair.

By repeating this process for each segment, a single combined areal density value is obtained for each segment.

These combined areal density values can then be used, together with the dimensions of the ISO freight 5 to generate a calculated weight of the ISO freight. The calculated weight is then considered against the observed weight and the variation between the two is used to normalise the value of the combined areal density value for each segment. A normalised combined areal density for each segment is produced as a result.

The normalised combined areal density for the segment is then used to correct the measured gamma emission measurement for that segment to give a corrected gamma emission measurement. This value is then used in the further consideration of the ISO freight 5.

In some instances, the results may suggest that an ISO freight 5 needs particular further consideration. Examples of such situations might be where the areal density value for one or more segments lies outside a predetermined range and/or above a limit and/or below a limit.

Where the ISO freight 5 is not full, the calculated weight or observed weight may be adjusted. The adjustment would reflect the proportion of the ISO freight 5 actually filled with the body of material. This could be determined from physical inspection of the body of material and/or by a transmission source which is shielded from detection when position below the fill level and is detected when positioned above the fill level.

The following section is concerned with the errors present by taking such an approach and the manner in which they can be accounted for at an improved level because of the nature of the approach.

It is possible in a first option, to consider the coincidence rate for a pair of detectors 20A and 22A in the absence of a body of material against the coincidence rate for the pair 20A and 22A with the body of material present. However, both count rates have similar uncertainties associated with them and these add in quadrature. Furthermore, barometric pressure change and solar activity changes (which are associated with Forbush events during which the muon flux is reduced) can also cause errors and would need to be separately accounted for.

In the preferred approach of the present invention, an alternative consideration is made. Basically the approach says that whilst a flux of muons N may pass through the top or second detector 20, there is a probability that due to the intervening process between the top and bottom detector that only a reduced flux L will reach the bottom detector 22. The probability of the process can be expressed as P. The probability P has two loss mechanisms. These are due to the geometry of the pair of detectors involved and due to the absorption by the body of material lying between the pair of detectors involved.

The top detectors 20 measure the interrogating flux N and so this is known with precision. The interrogating flux, N, is changed to the transmitted flux, L which is measured by the coincidence rate detected by the bottom detector. The coincidence measures the effect of the loss process and its probability P on the interrogating flux; this compares with the first option, where the coincidence is a sample of the transmitted flux.

Applying the preferred approach, the density calculation becomes:

$$D = f\left(\frac{L}{K \cdot N}\right) = f\left(\frac{(A \, \& X)_m}{K_{A \& X} A_m}\right)$$

where K is an accurate calibration factor relating to the impact of the body of material as the impact of geometry has been dealt with, N is the interrogating flux reaching the top detector and is measured exactly and L is flux reaching the bottom detector and is distributed as:

$$\hat{L} = N \cdot P$$

and from the binomial distribution:

$$\sigma_L = \sqrt{N \cdot P \cdot (1 - P)} = \sqrt{NP} = \sqrt{L} \text{ for } P << 1$$

$$\sigma_{\left(\frac{L}{K \cdot N}\right)} = \frac{\sqrt{L}}{K \cdot N} = \left(\frac{\sqrt{(A \, \& X)_m}}{K_{A \& X} A_m}\right)$$

as measured. It should be noted that this is $$\frac{1}{\sqrt{2}}$$

the uncertainty in the first option mentioned and so gives a reduced error in the measurement compared with the first option and demonstrates a fundamental advantage from considering the measurement as an interrogating flux N, loss process with probability P and transmitted flux L. This approach also measures and compensates for variations in the interrogating flux due to external events (such as, barometric pressure change and solar activity changes) directly.

The invention claimed is:

1. A method of determining an amount of radioactive material within a body of material, the method comprising:
   determining a preliminary measure of an amount of radioactive material within a body of material by directly and/or indirectly measuring emissions generated by the radioactive material;
   detecting muons and/or electrons generated by muons which have not passed through the body of material to give a first value;
   detecting muons and/or electrons generated by muons which have passed through the body of material to give a second value;
   processing the first value and second value to determine a factor, the factor being an expression of density and being a function of the second value divided by a product of a calibration factor and the first value; and applying the factor to the preliminary measure of the amount of radioactive material within the body of material to obtain a corrected measure of the amount of radioactive material within the body of material.

2. A method according to claim 1 in which the preliminary measure of the radioactive material within a body of material is corrected for density.

3. A method according to claim 1 in which the preliminary measure of the radioactive material within a body of material is corrected differently for different parts of the body of material.

4. A method according to claim 1 in which the method further comprises determining the weight and/or mass of a container and its body of material or the weight or mass of the body of material to provide a determined weight.

5. A method according to claim 4 in which a calculated mass or weight for the body of material and/or the container and body of material is obtained and the calculated mass or weight is compared with the determined mass or weight.

6. A method according to claim 5 in which one or more expressions of areal density or areal densities are adjusted if the calculated weight or mass is different from the determined weight or mass.

7. A method according to claim 6 in which the adjusted expression of areal density or adjusted areal density is used in determining the factor.

8. A method according to claim 5 in which one or more expressions of areal density or areal density are normalised based upon the calculated weight or mass compared with the determined weight or mass.

9. A method according to claim 1 in which the muons and/or electrons contributing to the first value and second value provide a coincidence count value, and the ratio of the coincidence count value to the first value is considered in the calculation of the factor.

10. A method according to claim 9 in which the first value is corrected before being used.

11. A method according to claim 10 in which the first value is corrected for the effect of geometry in respect of a pair of first and second detectors and/or a pair of first and third detectors used to obtain the second value.

12. A method according to claim 10 in which a separate correction is provided for each first value, with the correction being specific to the pair of first and second detectors giving the second value and/or the pair of first and third detectors giving the second value.

13. A method according to claim 9 in which the ratio of the coincidence count value to the first value is used to account for the effect of the body of material and/or container and body of material on particles passing through the second detector and on a path which would have taken them through the first detector if the body of material and/or container and body of material were absent.

14. A method according to claim 9 in which the ratio of the coincidence count value to the first value is used to account for the effect of the body of material and/or container and body of material on particles passing through the first detector and on a path which would have taken them through the third detector if the body of material and/or container and body of material were absent.

15. A method according to claim 9 in which the ratio of the coincidence count value to the first value is used to calculate an expression of areal density or an areal density for the body of material or segment thereof.

16. A method according to claim 9 in which two or more first detectors and/or two or more second detectors and/or two or more third detectors are provided and the ratio of the coincidence count value to the first value is considered for two or more different pairs of detectors.

17. A method according to claim 16 in which a pair of detectors is formed of a first and third detector or first and second detector.

18. A method according to claim 16 in which a calculation of an expression of areal density or of an areal density is provided for two or more pairs of detectors.

19. A method according to claim 1 in which a plurality of expressions of areal density or a plurality of areal densities are obtained for the body of material or for segments thereof.

20. A method according to claim 19 in which, where a plurality of expressions of areal density or a plurality of areal densities are obtained, those expressions or densities are combined to give a combined areal density expression or combined areal density.

21. A method according to claim 20 in which a weighted combination of two or more expressions of areal density or of areal densities is provided.

22. A method according to claim 1 in which an expression of areal density or an areal density is used to calculate a calculated mass or weight for the body of material and/or the container and body of material.

23. A method according to claim 1 in which corrected measure is greater than the preliminary measure.

24. A method according to claim 1 in which the first value is obtained from one or more first detectors provided below a measuring location at which the body of material is provided when the preliminary measure of radioactive material within the body of material is made, the first value being obtained with the body of material absent.

25. A method according to claim 24 in which the second value is obtained from one or more first detectors provided below a measuring location at which the body of material is provided when the preliminary measure of radioactive material within the body of material is made, the second value being obtained with the body of material present.

26. A method according to claim 25 in which the ratio or reciprocal ratio of the second value to the first value provides an indication or measure of the density for the body of material.

27. A method according to claim 1 in which the first value is obtained from one or more second detectors provided above a measuring location at which the body of material is provided when the preliminary measure of radioactive material within the body of material is made.

28. A method according to claim 1 in which the second value is obtained from one or more first detectors provided below a measuring location at which the body of material is provided when the preliminary measure of radioactive material within the body of material is made, the second value being obtained with the body of material present.

29. A method according to claim 28 in which the ratio or reciprocal ratio of the coincidence count value observed in the first value and second value, to the first value provides an indication or measure of the density for the body of material.

30. A method according to claim 28 in which the second value is obtained from one or more first detectors together with one or more third detectors.

31. A method according to claim 30 in which the ratio or reciprocal ratio of the coincidence count value obtained from the first detectors and third detectors to the first value provides an indication or measure of the density for the body of material.

32. A method according to claim 1 in which all of the detectors are provided within 2 m of the edge of the measuring location and/or a part of a container for the body of material and/or the body of material.

33. A method according to claim 1, wherein the preliminary and corrected measures of the amount of radioactive material within the body of material is expressed as one or more from the group including: a count, a count rate, an activity level, and a mass equivalent value.

34. Apparatus for determining an amount of radioactive material within a body of material, the apparatus comprising:
one or more detectors that measure a characteristic of radioactive material, the one or more detectors providing a preliminary measure of the amount of radioactive material within a body of material by directly and/or indirectly measuring emissions generated by the radioactive material;
one or more first detectors positioned above a measuring location, the one or more first detectors detecting one or more types of particle from an atmospheric source which have not passed through the body of material to give a first value;
one or more second detectors positioned below a measuring location, the one or more second detectors detecting one or more types of particle from an atmospheric source which have passed through the body of material to give a second value;
a processor for processing the first value and second value to give a factor, wherein the factor is an expression of density and wherein the factor is a function of the second value divided by a product of a calibration factor and the first value, the processor further applying the factor to preliminary measure of the amount of radioactive material within the body of material to obtain a corrected measure of the amount of radioactive material within the body of material.

35. A method of determining an amount of radioactive material within a body of material, the method comprising:
determining a preliminary measure of an amount of radioactive material within a body of material by directly and/or indirectly measuring emissions generated by the radioactive material;
using a second detector to detect one or more types of particle from an atmospheric source which have not passed through the body of material to give a first value;
using a first detector to detect one or more types of particle from an atmospheric source which have passed through the second detector and the body of material to give a second value;
processing the first value and second value to give a factor, the factor being an expression of density and being a function of the second value divided by a product of a calibration factor and the first value; and
applying the factor to the preliminary measure of the amount of radioactive material within the body of material to obtain a corrected measure of the amount of radioactive material with the body of material.

36. A method of establishing an error in a factor, the factor being used in a method of correcting a measure of radioactive material within a body of material, the method comprising:
determining a preliminary measure of an amount of radioactive material within a body of material by directly and/or indirectly measuring emissions generated by the radioactive material;
using a second detector to detect one or more types of particle from an atmospheric source which have not passed through the body of material to give a first value;
using a first detector to detect one or more types of particle from an atmospheric source which have passed through the second detector and the body of material to give a second value;
processing the first value and second value to give the factor, the factor being an expression of density and being a function of the second value divided by a product of a calibration factor and the first value;
applying the factor to the preliminary measure of the amount of radioactive material within the body of material to obtain a corrected measure of the amount of radioactive material with the body of material; and
determining the error in the factor by:
considering the first value as being accurately measured, considering the calibration factor as being accurately known and considering the second value as being the first value multiplied by a probability, the probability being that of a particle contributing to the first value and to the second value.

* * * * *